J. W. ORR.
ICE CAN.
APPLICATION FILED NOV. 16, 1912.

1,084,956.

Patented Jan. 20, 1914.
3 SHEETS—SHEET 1.

WITNESSES
Clarence M. Smith
J. B. Webster

INVENTOR
John W. Orr
By Benno S. Webster
ATTORNEY

J. W. ORR.
ICE CAN.
APPLICATION FILED NOV. 16, 1912.

1,084,956.

Patented Jan. 20, 1914.
3 SHEETS—SHEET 3.

WITNESSES
Clarence M. Smith
J. B. Webster

INVENTOR
John W. Orr
By Percy J. Webster
ATTORNEY

UNITED STATES PATENT OFFICE.

JOHN W. ORR, OF SACRAMENTO, CALIFORNIA, ASSIGNOR OF ONE-HALF TO R. CARSTENSEN, OF SACRAMENTO, CALIFORNIA.

ICE-CAN.

1,084,956.   Specification of Letters Patent.   Patented Jan. 20, 1914.

Application filed November 16, 1912. Serial No. 731,790.

*To all whom it may concern:*

Be it known that I, JOHN W. ORR, a citizen of the United States, residing at Sacramento, in the county of Sacramento, State of California, have invented certain new and useful Improvements in Ice-Cans; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in the apparatus used for freezing ice according to the process known as the raw water process, the object of the invention being to produce an apparatus by the use of which the ice may be frozen in a more rapid, expeditious and economical manner and also by means of which apparatus the ice blocks when frozen may be harvested much more quickly and cheaply and with a less amount of melting than can be done with the apparatus now commonly used.

The apparatus further embodies certain other advantageous elements especially designed to maintain the apparatus in an effective operating condition and at the same time permit the ice blocks to be rapidly formed.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings similar characters of reference indicate corresponding parts in the several views.

Figure 1:
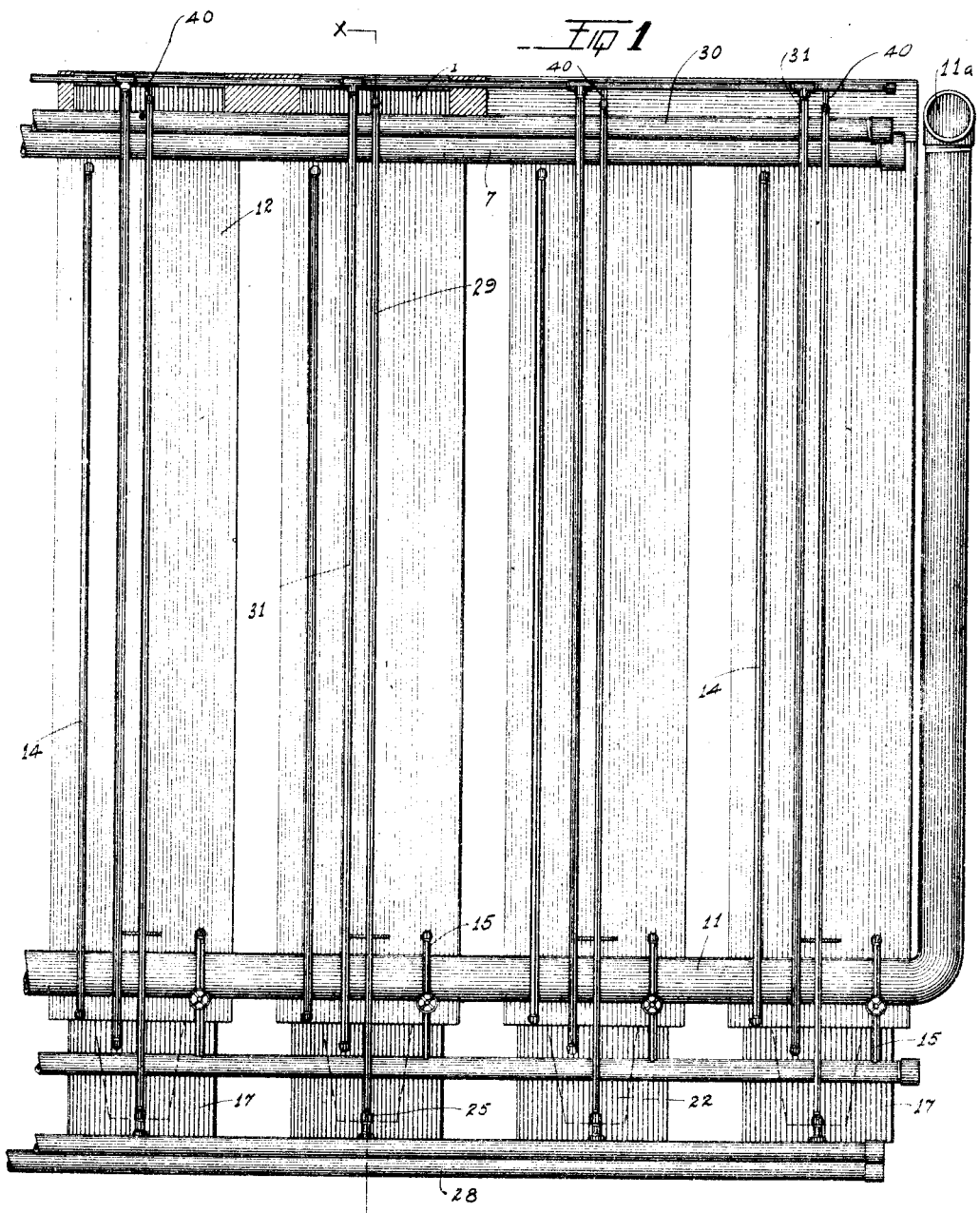
Figure 2:
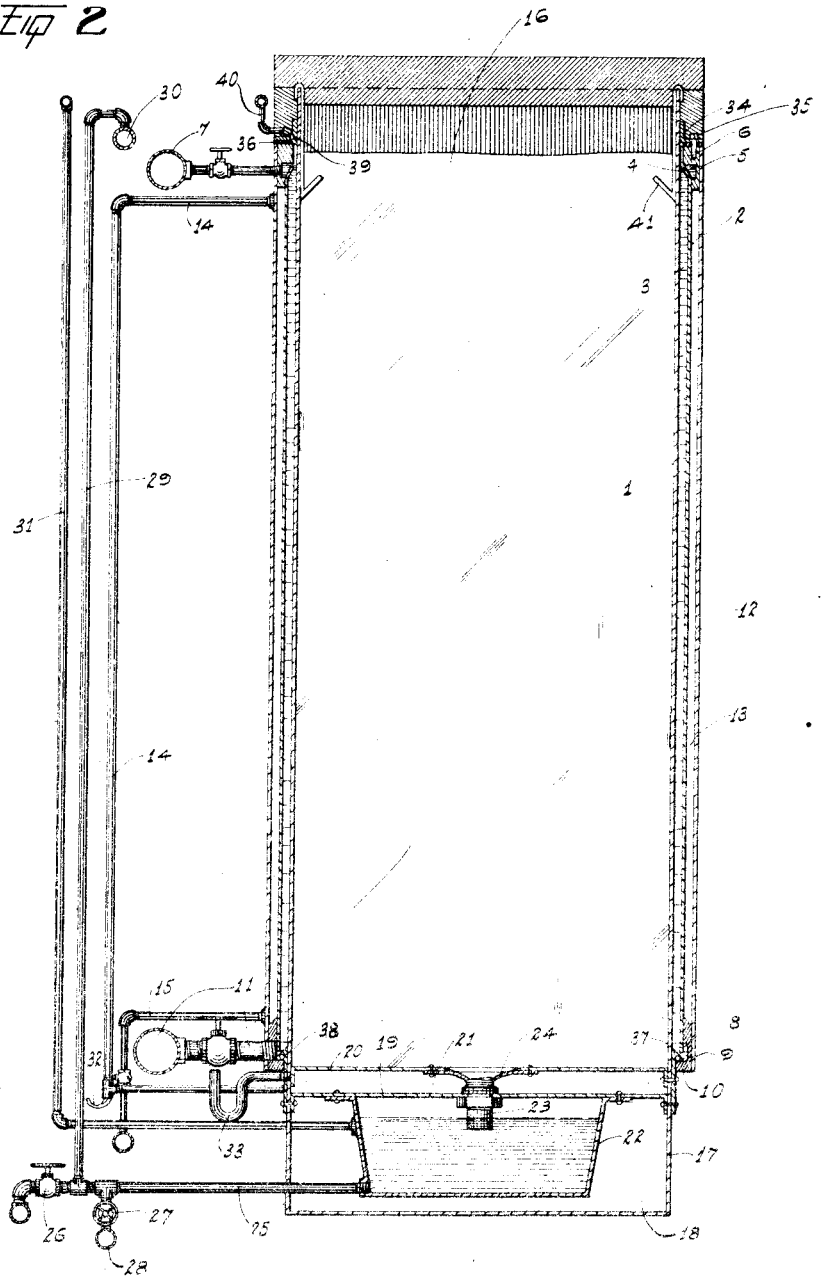
Figure 3:
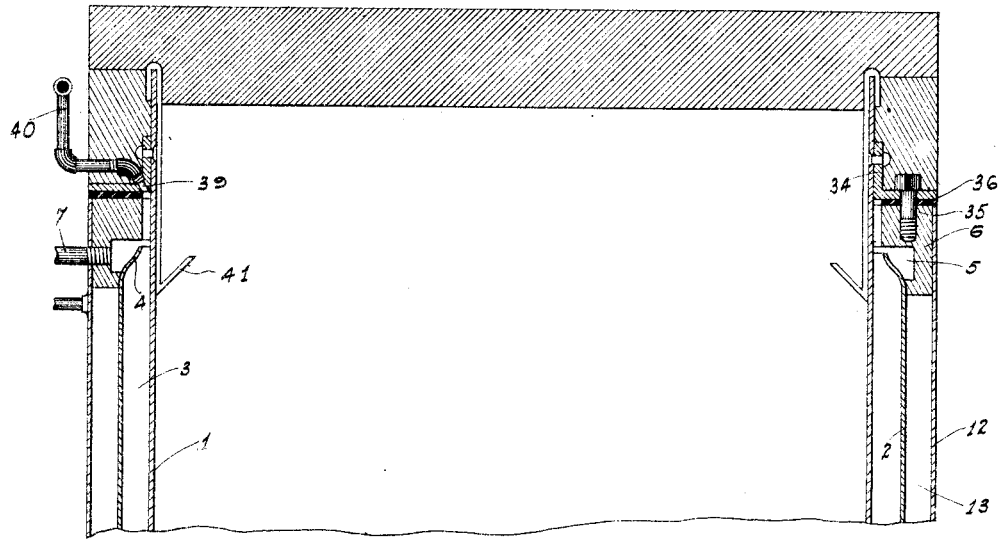
Figure 4:
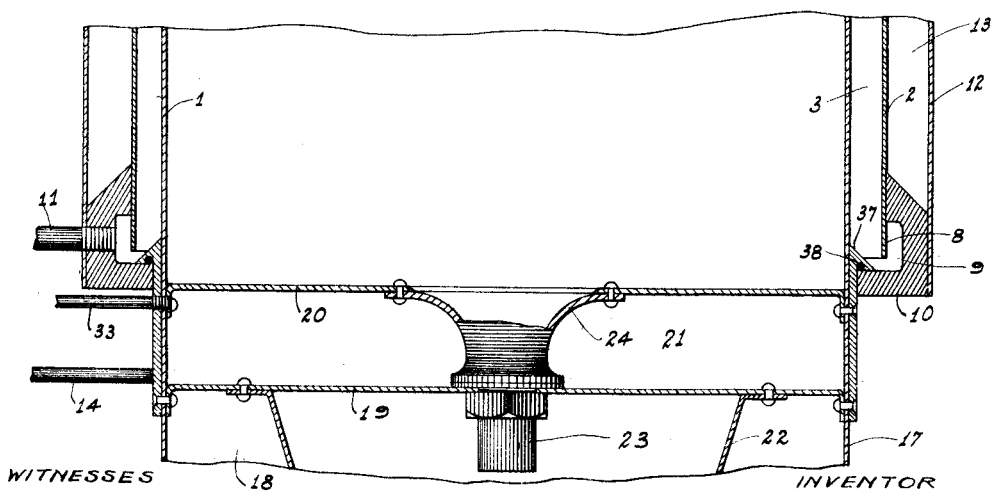

Figure 1 is a side elevation of a plurality of the cans shown in operative position. Fig. 2 is a sectional view taken on a line X—X of Fig. 1. Fig. 3 is a sectional view of the upper part of the can. Fig. 4 is a similar view of the lower part of the can.

Referring now more particularly to the characters of reference on the drawings, the numeral 1 designates the can proper which is provided with a spaced jacket 2 forming a brine chamber 3 completely surrounding the sides of the can 1. The numeral 4 designates a projecting flange on the upper end of the jacket 2 projecting over a recess or pocket 5 in a casting 6, there being a brine supply pipe 7 connected with said pocket or recess 5. This pocket or recess 5 extends entirely around the sides of the can 1 in order that such pocket will fill and over flow the flange 4 equally so as to distribute the brine at all times equally around the entire can through the medium of the chamber 3. Similarly the lower end of the jacket 2 is provided with a flange 8 projecting over a pocket or recess 9 in a casting 10, such pocket or recess 9 communicating with a brine outlet pipe 11. By means of this structure the brine will pass equally under the flange 8 into the pocket 9 and out of the outlet 11, which structure will in conjunction with the above mentioned structure keep the movement of the brine around the can equalized under all conditions.

The numeral 12 designates another jacket spaced from the jacket 2 and forming an intermediate chamber 13, which during the ice making process forms a suitable insulation to prevent the atmospheric heat from effecting the brine chamber 2. During the harvesting process this chamber 13 is used as a hot water jacket, the hot water being admitted to the lower end of said jacket through a pipe 15 and drained from the upper end through a pipe 14. As can readily be seen this will distribute heat from the hot water quickly around the can causing the ice block 16 to loosen equally all around the sides of the can (and at the bottom as will appear) thus permitting the harvesting to be done rapidly and effectively.

Secured to the bottom edge of the can 1 is an inclosing wall 17 forming a bottom chamber 18 provided with a cross or top wall 19 spaced from the bottom 20 of the can 1 forming an intermediate recess or chamber 21. Secured to the member 19 and disposed within the chamber 18 is a pan or vat 22, there being a pipe 23 communicating from said member 22 through the chamber 21 and into the can 1, such member 22 flaring outwardly as it enters the can 1 as at 24 for the purpose as will appear.

The numeral 25 designates a water supply pipe communicating with the bottom of the member 22 and provided with an inlet valve 26 whereby water may be admitted into the tank 22 through the pipe 23 and into the can 1 or for draining the can the valve 26 would be closed and a valve 27 would be opened to connect with a draw off pipe 28.

The numeral 29 designates an over flow pipe projecting vertically to above the top level at which the water is desired in the can 1 and hence when the can is filled to the desired level the water will then flow out through the pipe 29 and through an outlet pipe 30 which connects with all of the pipes 29 for a series or unit of the cans 1 as shown in Fig. 1. The above operation is for use when the cans are filled singly with the water but if it is desired to fill them all as a unit the pipe 30 could be closed and the water supply admitted to said pipe 30 and the water would then flow through the pipes 29 and into the can 1 filling all the cans of a unit with one operation.

The numeral 31 designates a compressed air supply pipe communicating with the tank 22, which air passes through the pipe 24 and into the water in the tank 1 during the freezing operation. Due to the water standing in the member 22 the force of the compressed air forcing the water down below the level of the pipe 23, such air then passing into the tank 1, will cause the motion of said air to be pulsative or agitated and this together with the spreading effect occasioned by the flared portion 24 will cause a thorough dissemination of the agitated air through the water in the can 1 as is necessary to thorough freezing in the raw water process for the purpose of preventing the impurities settling in the body of the cake of ice.

The space 21 between the bottom of the can 20 and the member 19 over the space 18 forms an insulation for the bottom of the can 1 and the cold passing through the bottom 20 of the can 1 through the space 21 and through the member 19 tends to cool the air passing through the member 22 so that it is in a semi-cooled condition when it passes into the can 1. On the other hand however, the air passing through the member 22 prevents the air in the space 21 from becoming too cold and thus prevents the bottom of the water in the can 1 from freezing and thus preventing perfect agitation which would prevent the freezing operation from being done as quickly and effectively as is necessary. During the harvesting operation this space 21 is filled with hot water from the pipe 14 in order to loosen the bottom of the cake of ice from the can 1. After the harvesting operation the hot water in the pipes 14 and in the space 21 is drawn off through a small relief valve 32, the main over flow from the space 21 for the hot water being through a trap 33, the purpose of the trap being to hold a sufficient amount of water to prevent the atmospheric air passing into the chamber 21 during the freezing process.

On the upper end of the can 1 is secured a projecting flange 34 by means of which the casting 6 which carries the members 2 and 12 may be secured in position with respect to said can 1 by means of bolts 35, there being gaskets 36 interposed between the flange 34 and the casting 6 to make a tight joint. Similarly on the lower end of the can 1 are secured projecting flanges 37 against which the casting 10 is drawn by the tightening up of the bolts 35, there being gaskets 38 interposed between the casting 10 and the flange 37.

In order to relieve the air pressure from the brine chamber 3 when the brine is admitted thereto, I provide an air outlet 39 provided with a pipe 40. The brine outlet pipe 11 has a vertical portion $11^a$ equal to the height of the cans 1 in order to maintain the brine in the chambers 3 at the complete vertical level of the cans under all conditions.

In practice as will readily be seen the water is admitted into the cans 1 through the members 22 and the compressed air then admitted through the pipes 31 passes through the members 2 and pipes 23 into the cans 1 agitating the water in the manner and for the purpose set forth. The brine is then admitted through the brine chamber 3 until the freezing operation is complete, the space 12 in the meantime acting as an insulation as above set forth. Then when the freezing operation is completed hot water is admitted into the space 12 and the space 21 which loosens the ice and permits it to be harvested by means of the usual hooks 41. The inclosed member 17 prevents the atmosphere from reaching the bottom of the can 1 while the space 21 acts both as an insulation and still at the same time absorbs enough heat from the air passing through the member 22 to prevent the water in the bottom of the can from freezing and preventing perfect circulation of the air.

From the foregoing description it will be readily seen that I have produced such an ice can as substantially fulfils the objects of this invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A device of the character described comprising a can, a jacket surrounding said can, a recessed member disposed around the upper edge of said jacket, the upper edge of said jacket projecting partly over the face of said recess, and means admitting brine to said recess, as described.

2. A device of the character described comprising a can, a jacket disposed around said can, a recessed member projecting around said jacket at each end thereof, the ends of said jacket projecting partly across said recesses, a brine inlet communicating with the top recess and an outlet leading from the bottom recess, as described.

3. A device of the character described comprising a can, a means for conducting a freezing medium about said can, an inclosed member disposed at the bottom of said can and having a cover spaced from the bottom of said can, a vat disposed in said inclosed member and being attached to said cover, a pipe leading from said vat into said can and water and air supply means communicating with said vat, as described.

4. A device of the character described comprising a can, a freezing means disposed around said can, an inclosed member on the bottom of said can, a cover on said inclosed member spaced a distance from the bottom of said can and forming an intermediate chamber, a vat secured on said cover within said inclosed member, a pipe leading from said vat into said can, the upper end of said pipe flaring outward and means for admitting air and water into said vat, as described.

In testimony whereof I affix my signature in presence of two witnesses.

JOHN W. ORR.

Witnesses:
JOSHUA B. WEBSTER,
CLARENCE M. SMITH.